United States Patent [19]
Zemit et al.

[11] Patent Number: 6,000,739
[45] Date of Patent: Dec. 14, 1999

[54] BARBEQUE GRILL HANDLE AND UTILITY TOOL

[76] Inventors: Paul S. Zemit; Rose A. Zemit, both of 1529 W. Pratt Blvd., Chicago, Ill. 60626

[21] Appl. No.: 09/079,951

[22] Filed: May 15, 1998

[51] Int. Cl.⁶ .................................................. F24B 15/00
[52] U.S. Cl. .............................. 294/9; 7/109; 126/25 R; 294/12; 15/236.08
[58] Field of Search ............................... 126/25 R; 294/2, 294/7, 9, 10, 12; 15/236.08; 7/109

[56] References Cited

U.S. PATENT DOCUMENTS

| | | |
|---|---|---|
| D. 100,390 | 4/1936 | Robison, Jr. . |
| 163,659 | 5/1875 | Hoyt . |
| D. 282,518 | 2/1986 | Mahoney . |
| 338,227 | 3/1886 | Hart . |
| 465,865 | 12/1891 | Kuhn . |
| 489,372 | 1/1893 | Dister . |
| 896,133 | 8/1908 | Mayer . |
| 1,083,808 | 1/1914 | Dunson . |
| 1,493,355 | 5/1924 | Liptak . |
| 1,587,350 | 6/1926 | Parke . |
| 1,723,505 | 8/1929 | Haertter ........................................ 294/7 |
| 2,148,944 | 2/1939 | Helm .................................... 15/236.01 |
| 2,597,477 | 5/1952 | Haislip .................................... 126/25 R |
| 2,747,911 | 5/1956 | Kuever . |
| 3,820,185 | 6/1974 | Phillips . |
| 4,176,417 | 12/1979 | Ruff . |
| 4,222,599 | 9/1980 | Gale et al. . |
| 4,282,625 | 8/1981 | Hulett . |
| 4,471,985 | 9/1984 | Mahoney . |
| 4,482,181 | 11/1984 | Shepherd . |
| 4,801,166 | 1/1989 | Jordan et al. . |
| 5,440,777 | 8/1995 | Olivieri .................................... 15/236.01 |
| 5,729,854 | 3/1998 | Powers ........................................ 294/10 |

FOREIGN PATENT DOCUMENTS

| | | |
|---|---|---|
| 54255 | 1/1890 | Germany . |
| 393355 | 4/1924 | Germany . |

*Primary Examiner*—Carroll Dority
*Attorney, Agent, or Firm*—Welsh & Katz, Ltd.

[57] ABSTRACT

A compound hand held tool for use with the round pot belly type of barbeque grills that have circular grills made of heavy wire. While the primary purpose of the invention is to operate as a handle for such grills, it is also designed to be used to scrape grills to help clean them, to open and close hot air vents normally found on barbeque grills and to manipulate hot charcoal briquets. In the preferred embodiment this tool is made by machine working stainless steel and is provided with a heat resistant handle.

8 Claims, 2 Drawing Sheets

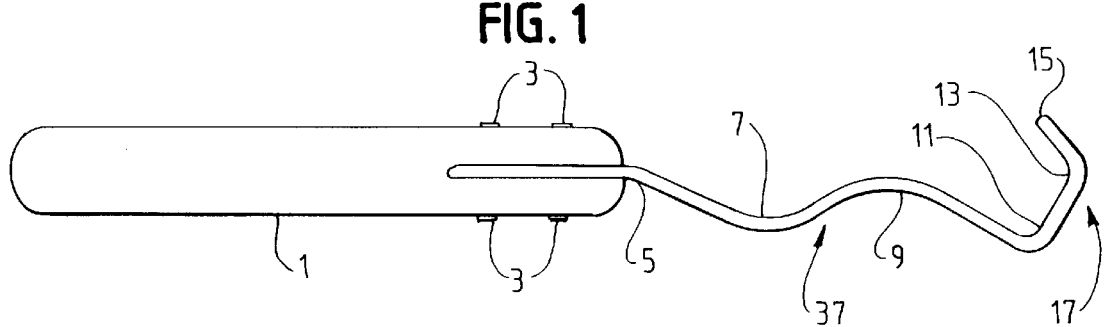
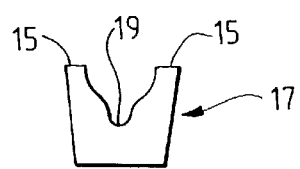
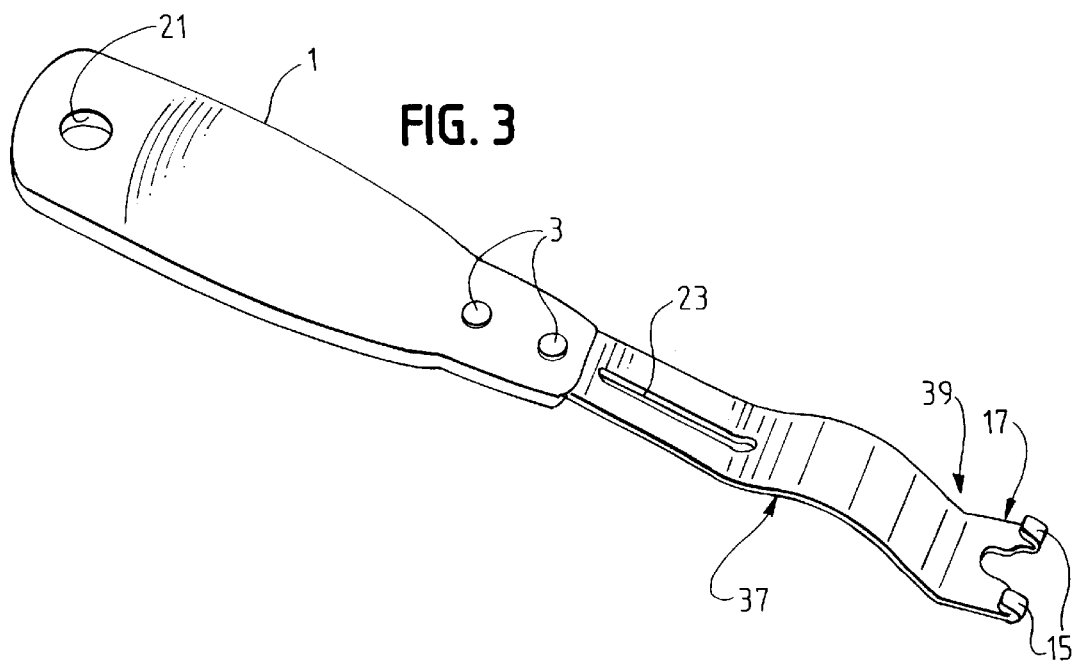

BARBEQUE GRILL HANDLE AND UTILITY TOOL

CROSS-REFERENCES TO RELATED APPLICATIONS

None.

STATEMENT AS TO RIGHTS TO INVENTIONS MADE UNDER FEDERALLY-SPONSORED RESEARCH AND DEVELOPMENT

This invention was not developed with any federally sponsored assistance.

BACKGROUND OF THE INVENTION

1. Field of the Invention

The field of the invention is compound hand held tools designed for use with Barbeque grills, especially the round pot belly type of barbeque grills, also known as kettle grills, that have circular grills made of heavy wire, although the invention works well with most other types of grills as well. While the primary purpose of the invention is to operate as a grill lifter and manipulater, the invention also provides means to scrape grills to help clean them, to manipulate hot air vents found on barbeque grills and to manipulate hot charcoal briquets.

2. Description of the Related Art Including Information Disclosed Under 37 CFR Section 1.97–1.99

The inventors have searched the current market place and were not able to locate any tool that could act as a handle for a barbeque grill, let alone perform all of the functions that the present invention is capable of. Most grills for the round pot belly type or kettle barbeque grills do not come with any handle and when they are in place to be utilized they are recessed down into the body of the kettle, thus making them difficult to remove, especially when hot. The present invention was designed to fill the need to be able to securely manipulate grills of the type described with one hand. Additionally, the present invention was designed to fill the typical needs of a person operating a barbeque grill by acting as a utility tool. The present invention is able to scrape and thereby clean grills and to manipulate hot air vents and position hot charcoal briquets, thus eliminating the need of any other tool for a person operating a barbeque grill.

While no product was located on the market that could act as a handle for the above referenced type of grill, let alone act as a comprehensive utility tool of an operator of a barbeque grill, a patent search did disclose the material prior art set forth hereinbelow. Copies of the patents described hereinbelow are submitted herewith. All of the material prior art of which Applicants are aware is set forth herein below.

U.S. Pat. No. 4,482,181, Grill Lifter, issued Nov. 13, 1984, inventor Charles G. Shepherd, shows a barbeque grill lifter. However, Shepherd's Grill Lifter requires the user's hand to be directly over the fire while grasping the grill with the handle and even when the grill is removed from the fire the user's hand would still be in close proximity to the grill which would then still be hot. These problems are overcome by the present invention. When lifting a grill that has food on it, thus requiring the grill to remain level, Shepherd's Grill Lifter requires the user to apply significant pressure to the handle to prevent the handle from twisting in the user's hand. No twisting force is created in the use of the present invention under the same circumstances. All forces arising from the use of the present invention move in the directions of and through the length of the handle or at 90 degrees thereto as the result of gravity. Unless the grill was loaded with food in an unballanced manner, i.e., not evenly distributed along either side of the center support spine of the grill, there would be no tendency for the present invention to attempt to twist in the hand of a user. Sheperd's Grill Lifter also requires a larger area of the grill to operate and can not grab hold of the outermost rib of a round grill as the present invention does. Additionally, Sheperd's Grill Lifter is not a compound tool and would not be useful as a grill cleaner.

Design Pat. No. Des. 282,518, Barbeque Grill Lifting Tool, issued Feb. 11, 1986, inventor Patrick E. Mahoney, shows a barbeque grill lifter. However, the way in which Mahoney's Barbeque Grill Lifting Tool functions is not understood by these inventors or this author but it appears that it does not actually grasp the grill in any way and would thus not provide the user with secure control over the grill. The parallel grooves in the bottom of Mahoney's Barbeque Grill Lifting Tool make it appear that it was either intended to work with a different type of grill or to function in some fundamentally different manner than the present invention. Additionally, Sheperd's Grill Lifter is not a compound tool and would not be useful as a grill cleaner.

U.S. Pat. No. 1,587,350, Oven-shelf Handle, inventor William Parke, issued Jun. 1, 1936, shows an oven-shelf handle which while capable of being designed to grasp a grill, was obviously not intended to do so. It could not be placed in its final position where it could securely grasp the grill until the grill was actually lifted out of the body of the barbeque because the grills are recessed down into the body of the barbeques and this prevents the user from getting to the edge of the grill as reflected in FIG. 2 of Parke's Oven-shelf Handle. Parke's Oven-shelf Handle also has the problem of needing different sized models depending on whether the grill is composed of an even or odd number of parallel struts because in use it needs to be placed to straddle the axis of the grill. Additionally, Parke's Oven-shelf Handle could not function as a grill scraper.

U.S. Pat. No. 2,747,911, Food Handling and Scraping Tool For Use With Grills, issued May 29, 1956, inventor Paul H. Kuever, shows a tool that is suited to scrape a grill but is of no use in attempting to physically lift and handle a grill.

SUMMARY OF THE INVENTION

The invention was designed to be a multi-purpose utility tool for the operator of a barbeque grill, especially the round pot belly type of barbeque grills that have circular grills made of heavy wire. While the primary purpose of the invention is to operate as a secure one-handed operation grill lifter, it is also designed to be used to scrape grills to help clean them, to manipulate hot vents normally found on barbeques grills and to position hot charcoal briquets. The invention has no moving parts when in operation thus ensuring trouble free operation. All of the different types of tasks that can be performed by the invention are accomplished by a unique two prong claw which is attached to a handle.

BRIEF DESCRIPTION OF THE DRAWINGS

FIG. 1 shows a side view of the invention with a handle attached.

FIG. 2 shows a front end view of the invention from the perspective of number 17 in FIG. 1.

FIG. 3 shows the same species of the invention as FIG. 2 but from a top perspective.

Figure 4:
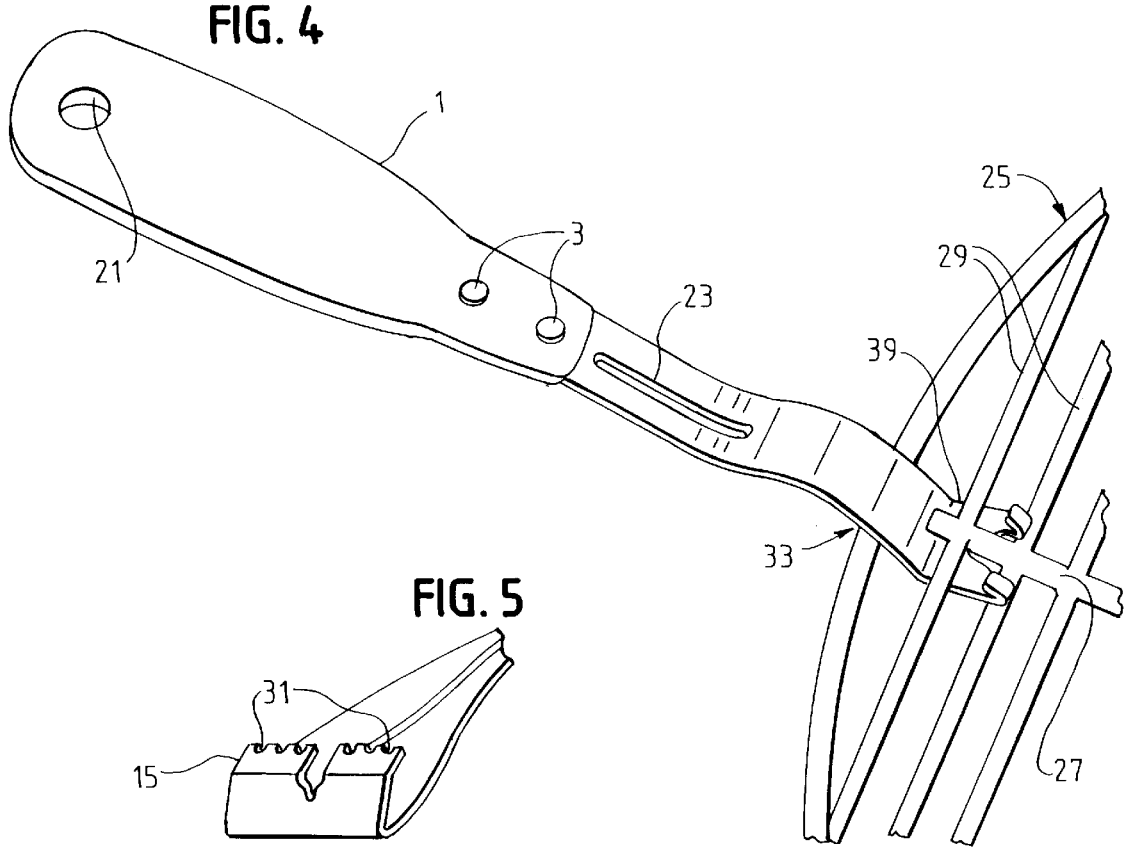
FIG. 4 shows the same perspective of the invention as FIG. 3 but with the invention in place at the edge of a grill to act as a handle for the grill.

REFERENCE NUMERALS IN DRAWINGS 1 handle made of heat resistant material,
3 means for affixing handle to claw, i.e., screws, rivets, thumb screws, or quick release pins,
5 first downward bend,
7 first upward bend,
9 second downward bend,
11 second upward bend,
13 third upward bend,
15 termination end of prongs of claw,
17 portion of claw where prongs separate from each other,
19 notch for center support spine of grill,
21 rack hanger hole,
23 reinforcement ridge,
25 circumscribing border of grill,
27 center support spine of grill,
29 ribs of grill,
31 additional scraping notches,
33 area of claw in contact with circumscribing border of grill when in use,
35 area of prongs in contact with rib of grill when in use,
37 area of claw that comes in contact with edge of kettle, and
39 inside hooked portion of claw.

DETAILED DESCRIPTION

FIG. 1 shows a side view of a basic version of the Barbeque Grill Handle and Utility Tool. As is reflected, there is only one significant component of the invention, a specifically formed claw which is the single object to which reference numbers 5 through 17 refer, coupled to a handle 1. The claw is composed of metal and in the preferred embodiment, stainless steel. The handle is made of a heat resistant material such as wood or thermo-set plastic.

While the handle will typically be affixed to the claw with screws, bolts or rivets 3 some models will be designed with removable handles to allow the tool to be broken down for transportation and camping. The prefered embodiment of the removable handle model utilizes thumb screws or quick release pins to attach the claw to the handle so as to allow the handle to be removed without the use of any other tool such as a screw driver.

In the preferred embodiment of the model for use with the popular size of small grills of 35 cm. diameter, the handle is approximately 13.3 cm. long, 1.9 cm. thick, 3.5 cm. wide at one end and it tapers to 1.9 cm. wide at the insertion point of the claw. The handle is recessed sufficiently into the handle to provide sufficient stability, approximately 3.8 cm. in the preferred embodiment of the model for use with small grills.

While the claw can be made from a variety of materials it is anticipated that it will normally be made of metal and that it will shaped by being forged, cast, machined or a combination thereof. In the preferred embodiment of the model for use with small grills, the claw is made of forged stainless steel which is machined by stamping to provide a reinforcement ridge 23 (FIG. 3) for additional strength.

On the preferred embodiment of the model for use with small grills the claw is approximately 1.5 mm. thick. Starting at the end of the claw that inserts into the handle, the metal is approximately 1.9 cm. wide and it gradually widens to approximately 2.4 cm. at the second upward bend 11 (FIG. 1) and continues to widen to approximately 2.9 cm. at the termination end of the prongs of the claw 15.

On the preferred embodiment of the model for use with small grills, starting at the end of the claw that inserts into the handle, the metal of which the claw is made is appoximately 3.8 cm. long between the starting point and the beginning of the first downward bend 5 (FIG. 1) which is curved 22 degrees downward on a 1.6 cm. radius. The metal is then straight for approximately 2.1 cm. until it reaches the beginning of the first upward bend 7 which is curved 46 degrees up on a 1.6 cm. radius. The metal is then straight for approximately 5 mm. until it reaches the beginning of the second downward bend 9 which is curved 55 degrees down on a 2.85 cm. radius. The metal is then straight for approximately 1.9 cm. until it reaches the beginning of the second upward bend 11 which is curved 90 degrees up on a 1.6 cm. radius. The metal is then straight for approximately 9 mm. until it reaches the beginning of the third upward bend 13 which is curved 75 degrees up on a 1.6 cm. radius. The metal is then straight for approximately 9 mm. until it reaches the termination end of the prongs 15.

FIG. 2 shows the portion of the claw that separates into the two prongs of the claw but it only shows about half of the length of each of the individual prongs. Some models of the invention could be provided with more than two prongs but on all grills tested two prongs are adequate to securely grasp, hold and manipulate the grill. The prongs are the portions of the claw which begin at the notch for center support spine of grill 19 and include all of the material of the claw to the termination ends of prongs of the claw 15 (FIG. 1).

The bottom line of FIG. 2 is a front view of the second upward bend 11 and the uppermost portion of FIG. 2 is the third upward bend 13 that occurs near the middle of the length of the prongs. The termination ends of the prongs 15 (FIG. 1) can not be seen from the perspective reflected in FIG. 2.

The notch for center support spine of grill 19 (FIG. 1) is designed and shaped to snugly accomodate the center support spine of the grill 27 (FIG. 4). Because the center support spine 27 (FIG. 4), the circumscribing border 25 (FIG. 4) and the ribs 29 (FIG. 4) of the grill are all made of the same gauge of wire, the notch for the center support spine of the grill snugly fits all the wires composing the grill and thus provides an excellent scraper for all portions of the grill. In addition to the center support spine of the grill which can be used as a scraper, the claw can be provided with a plurality of notches spaced equal distances apart, which coincide with distance between the ribs of the grill which is desired to be cleaned, and of such size so as to allow the notches to snugly accomodate the ribs of the grill to facilitate cleaning by scraping.

Figure 5:
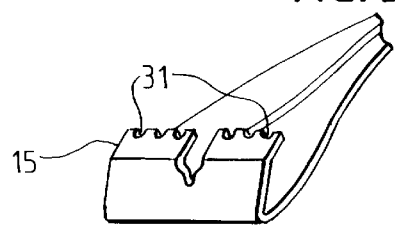
FIG. 5 shows an off-center front end view of a different and larger model of the invention designed for use with larger grills.

The additional scraping notches 31, (FIGS. 5 and 6) can be located at various locations on the claw and in fact can be in several different locations on the same claw to allow the same claw to effectively scrape different sizes of grills. FIG. 5 shows additional scraping notches 31 located on the termination ends of the prongs of the claw 15 (FIG. 1). However, the additional scraping notches 31 can be just as easily located on any other flat edge of the claw, including on outer surfaces of bends in the claw, such as along the bottom edge of the second upward bend 11 (FIG. 5), provided the material of which the claw is constructed is of sufficient strength and proper thickness to not jeopardize the structural integrity of the claw by placing additional scraping notches along the surface of the bend.

Other than locating the additional scraping notches on the termination end of the prongs of the claw, the other preferred location for the additional scraping notches is along the sides of the claw from the second upward bend 11 to the third upward bend 13 and from the third upward bend 13 to the termination end of the prongs of the claw 15. Especially on the model of the invention designed for use with larger grills, a plurality of sets of additional scraping notches in a variety of sizes with different spacing distances between them in different locations on the claw, provides the claw with the means to effectively scrape different sizes of grill wires and different spacings of grill wires. This feature is especially useful since the model of the invention for larger grills can securely lift and manipulate the smaller grill sizes as well as the larger sizes of grills. Therefore it is advantageous to provide the claw with means to effectively scrape a variety of sizes of grills. Additionally, since this invention does effectively work as a handle on different types of grills, other than just the round pot belly type of barbeque grills that have circular grills made of round wire, the claw can also be provided with different shaped additional scraping notches to effectively accomodate different types of grills, such as those made of square wire.

FIG. 3 shows a rack hanger hole 21 in the handle 1 which is simply provided for the convenience of the user and has no relationship to the functionality of the invention. FIG. 3 also shows a different perspective of the claw so that the relationship between FIG. 1 and FIG. 2 can be better understood.

FIG. 4 shows the invention in use acting as a handle for a grill. When in use, the invention is in contact with the circumscribing border of the grill 25 at area 33 (FIG. 1), the center support spine of the grill 27 is in contact with the notch for center support spine of grill 19 (FIG. 2) and the outermost rib of the grill is in contact with area 35 of the prongs (FIG. 3).

FIG. 5 shows a frontal view of the prongs of the claw with additional scraping notches 31. While none of the drawings show additional scraping notches on the model for small grills in FIGS. 1, 3 and 4 the preferred embodiment of the model for small grills has additional scraping notches on both sides of the claw between the second upward bend 11 and the third upward bend 13.

Figure 6:
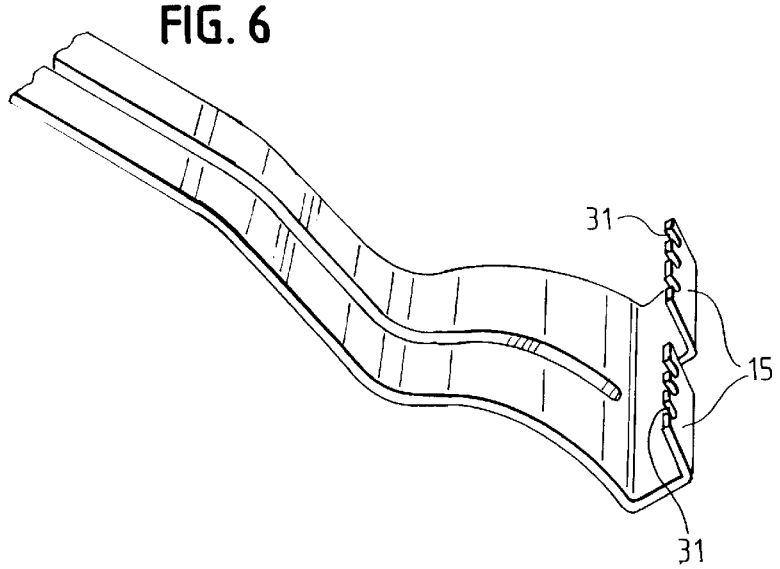
FIG. 6 shows an upper side view of the same species of the invention as is reflected in FIG. 5, without a handle attached.

FIG. 6 shows a portion of a model of the invention for use with larger grills. This drawing does not show a handle attached to the claw although a handle could be provided on all models of the invention. However, a handle would not be necessary for the invention to function as intended.

While many grills come equipped with handles, the handles become too hot to grasp with bare hands when the grill is over a heat source because they are normally composed of the same metal material the grill is composed of. Normally no insulating material is provided on the handles provided by the manufacturers of the grills; thus there is still a need for a means to lift the hot grills which the present invention can provide.

The use and operation of the present invention is simple and for all uses of the invention affecting a grill, actually occurs in only two dimensions. The Barbeque Grill Handle and Utility Tool can effectively operate as a handle of the round grills made of wire in two different ways but in both instances the prongs of the claw are intended to straddle the center support spine of the grill.

The first method of using the invention as a grill handle is to grasp the handle with one hand, weave the termination end of the prongs of the claw first between the circumscribing border of the grill and the outermost rib of the grill, then up between the outermost rib of the grill and the rib adjacent to the outermost rib of the grill. Once the tool is thus in place, a downward force on the handle will automatically bring the grill and tool into their final relationship position for lifting the grill in the following manner. After the downward force is initiated, area 37 (FIG. 1) of the claw comes in contact with the edge of the kettle portion of the barbeque grill and that contact point becomes a fulcrum for the invention. Continued downward pressure on the handle then starts lifting the portion of the claw engaged to the grill. As the grill is raised, the grill settles into position in the claw by itself and reaches its final position by the time the handle, claw and grill have reached a horizontal plane. Once the grill is in position in the claw the user can lift the grill and manipulate it through single handed control of the Barbeque Grill Handle and Utility Tool because the relative positions of the grill and handle are very stable.

Removing the Barbeque Grill Handle and Utility Tool from a grill is a simple reversal of the movements which brought the tool and grill into position for lifting the grill.

The other fundamental way to use the Barbeque Grill Handle and Utility Tool to lift a grill is to weave the termination end of the prongs of the claw between any two ribs of the grill with the prongs passing on opposite sides of the center support spine of the grill. A continued downward force on the handle will bring the notch for center support spine of grill 19 into contact with the upper surface of the center support spine. This contact point between the grill and the tool then becomes a fulcrum point for the handle. The termination end of the prongs are then woven up around the other side of one of the ribs which the termination end of the prongs have just been woven down between by application of a horizontal force to the handle along the length of the center support spine of the grill in the opposite direction from which the user desires to move the termination ends of the prongs. Force is continued to be applied to the handle in the same direction until unobstructed movement is prevented by the relative position of the claw and the grill. The claw is now positioned to operate as a very stable handle for the grill and the user only needs to lift the handle of the Barbeque Grill Handle and Utility Tool to lift the grill. When the invention is engaged to a grill in this fashion and the grill is being solely supported by the invention, the invention and the grill are located at approximately 85 degrees away from being in the same horizontal plane from a side view perspective. The Barbeque Grill Handle and Utility Tool is removed from the grill by reversing the directions of movement that got the tool into place to act as a handle for the grill.

Using the invention in the second mentioned manner, the user can remove the charcoal grate at the bottom of kettle type Barbeque grills, whether or not the grate is loaded with coals.

In similar fashion the Barbeque Grill Handle and Utility Tool can be used as a handle on virtually any type of grill made of rods of any shape or size.

There is a model of the Barbeque Grill Handle and Utility Tool which has an easily removable handle, to facilitate packing for camping or storage. In this model the means for attaching the handle to the claw are thumb screws or quick release pins.

While the preferred embodiment of the Barbeque Grill Handle and Utility Tool has a handle separate and apart from the claw, there is no need to have a separate handle for the claw. The end of the claw, opposite the terminal ends of the prongs could be used as the handle without any insulating material because the user's hand is not located over the heat source, when using the claw to grasp the outermost rib of the grill and since the Barbeque Grill Handle and Utility Tool does not stay attached to the grill when not in use, the portion of the claw the user would hold on to would not get hot enough to bother the user. Even when using the Barbeque Grill Handle and Utility Tool in the vertical position to lift a grill, the user's hand is far enough away from the heat source to not make the user uncomfortable.

The prongs of the claw of the Barbeque Grill Handle and Utility Tool can be used to open and close hot air vents located on most Barbeque grills by simply placing the portion of the vent designed to be grasped between the prongs of the claw and applying force to the handle in the direction the user desires to move the vent.

The claw can also be used to do a very effective job of manipulating hot barbeque briquets because the briquets can actually be picked up with the claw by centering the briquet in the inside portion of the hooked portion of the claw 39 (FIG. 1).

The Barbeque Grill Handle and Utility Tool has been designed in several models of different lengths, widths and thicknesses to produce better leverage and stability on different sizes of grills.

It would be evident that variations can be made within the scope of the invention. For example, the claw can be provided with more than two prongs. Additionally, the claw can be modified so that the handle, claw and grill do not lie in a single plane when the invention is lifting a grill with the outermost rib. It will also be evident that other variations can be made within the scope of the invention and such variations are within the scope of the claims.

We claim:

1. In a device for use with a grill over a heat source such as a barbeque, the grill having spaced parallel ribs, the device comprising:

a removable bifurcated two pronged claw having an inside surface, an outside surface and two opposite ends, one end having the two prongs extending therefrom and the opposite end shaped so as to be used as a handle, the claw having a first bend at about the handle, a second bend opposing that of the first bend, a third bend substantially similar to the first bend and a fourth bend in the general direction of the second head at about which the bifurcated claw is formed as a bent portion in the general direction of the first bend, whereby the two prongs of the claw can be woven under any one of the ribs of the grill so as to effectively grasp the grill so as to allow the grill to be lifted and manipulated.

2. A device according to claim 1 further comprising:

means for scraping and thereby cleaning the grill.

3. A device according to claim 2 further comprising:

the handle being made of insulating material.

4. In a device for use with a grill over a heat source such as a barbeque, the grill having spaced parallel ribs and a circumscribing border the device comprising:

a claw having two opposite ends, a circumscribing border, an inside surface and an outside surface;

a pair of substantially identical bifurcated prongs, each shaped like a bent finger projecting from one end of the claw and bent in the same direction that the claw is curved, having an inside surface on the inside of the bend, the base of the prongs abutting, positioned so as to form a V between the prongs, the claw having a first bend at about the handle, a second bend opposing that of the first bend, a third bend substantially similar to the first bend, and a fourth bend in the general direction of the second head at about which the bifurcated claw is formed as a bent portion in the general direction of the first bend;

a handle separable from the claw and disposed at the opposite end of the claw from the prongs;

whereby the prongs of the claw are woven under any one of the ribs of the grill so as to effectively grasp the grill, the inside surface of the prongs being in contact with the rib the prongs and the outside surface of the claw being in contact with either a rib adjacent to the rib in contact with the prongs or the circumscribing border when the prongs are in contact with the outermost rib of the grill.

5. A device according to claim 4 further comprising:

means for scraping at least one rib of the grill at a time so as to clean the grill.

6. A device according to claim 4 further comprising:

a row of evenly spaced notches located on any flat edge of the claw which notches are sized and spaced so as to allow them to snugly accommodate the parallel ribs of the grill so as to provide the claw with means for scraping and thereby cleaning the grill.

7. A device according to claim 6 further comprising:

the handle being made of insulating material.

8. A device according to claim 4 further comprising:

the end of the claw to which the handle is attached being shaped so as to allow the handle of the device to be in the same horizontal plane as the grill, when acting as a handle for the grill, when the device has been used to grasp the outermost rib of the grill and the outside surface of the claw is in contact with the circumscribing border of the grill.

* * * * *